Figure 1:
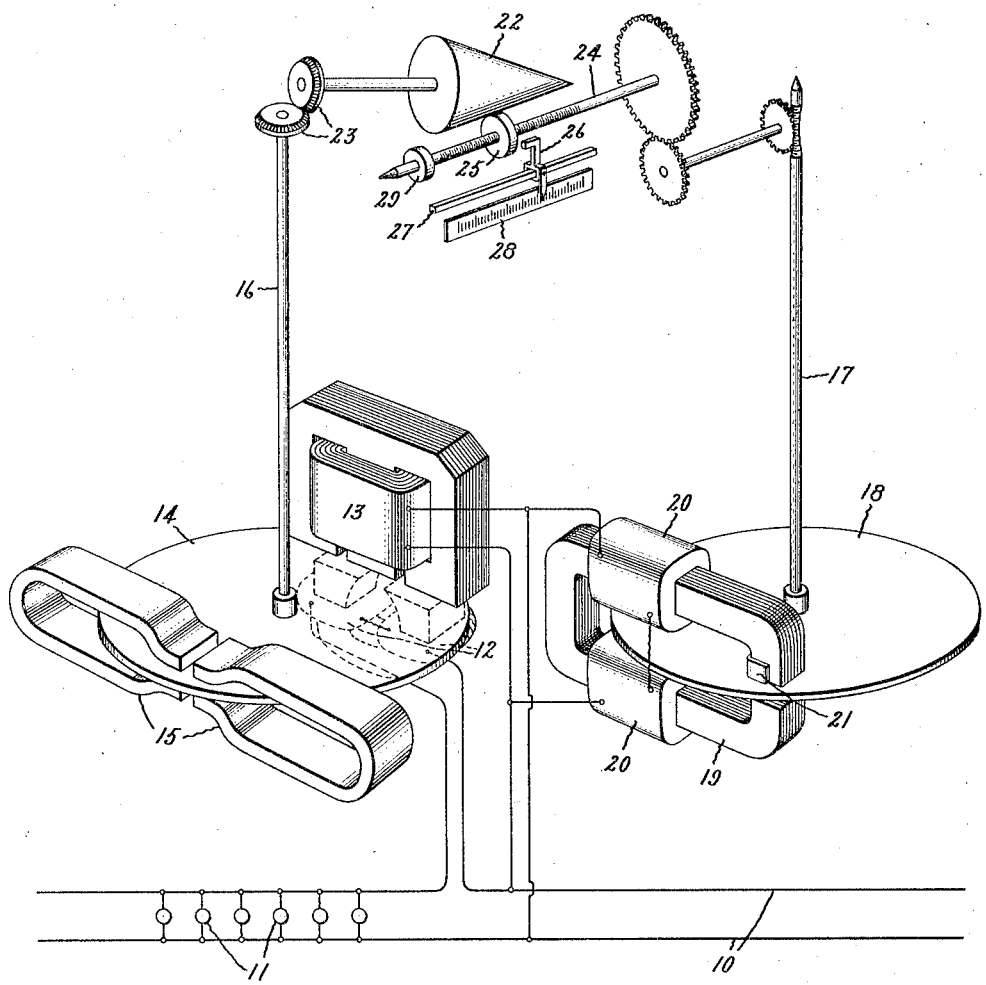

C. I. HALL.
DEMAND INDICATOR.
APPLICATION FILED SEPT. 5, 1916.

1,331,059.

Patented Feb. 17, 1920.
3 SHEETS—SHEET 1.

Inventor:
Chester I. Hall,
by Albert G. Davis
His Attorney.

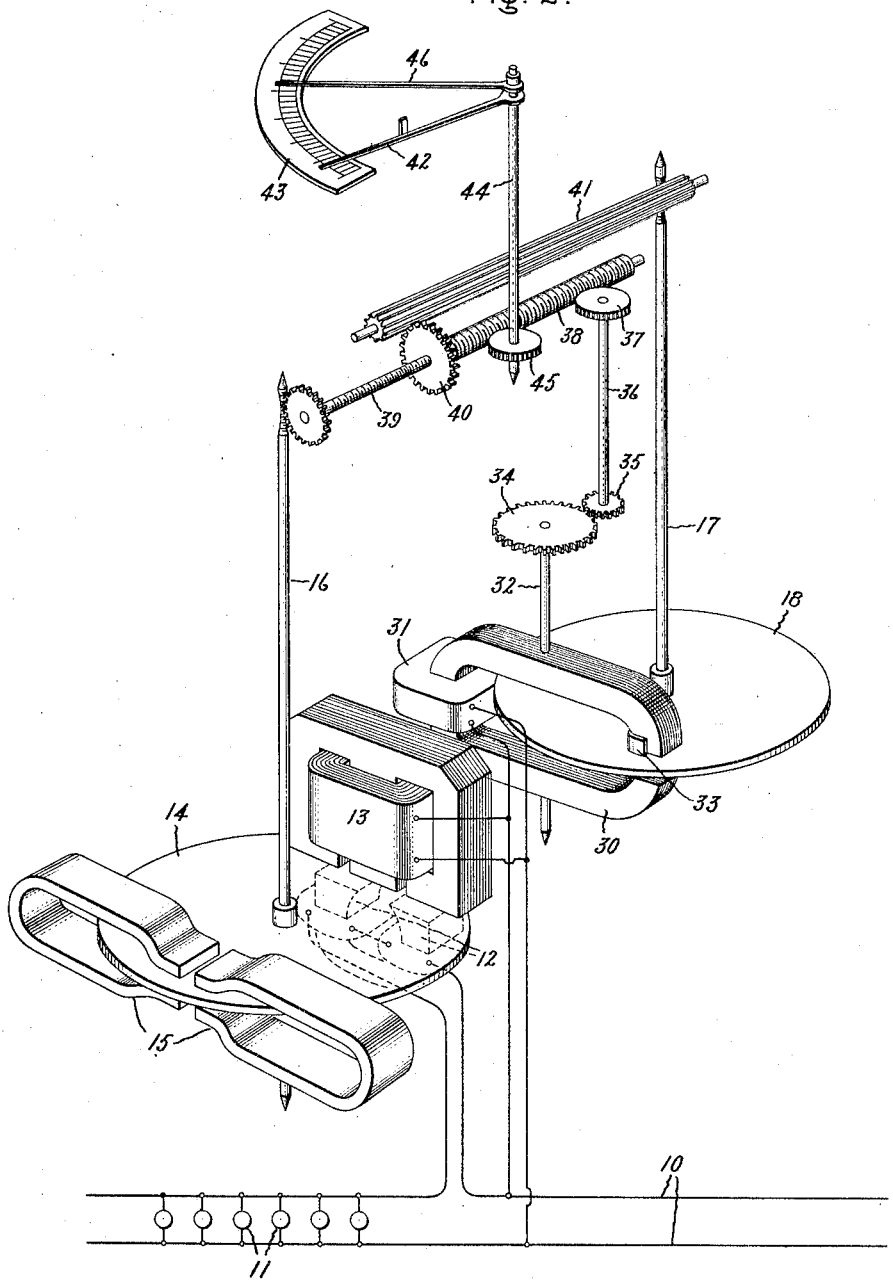

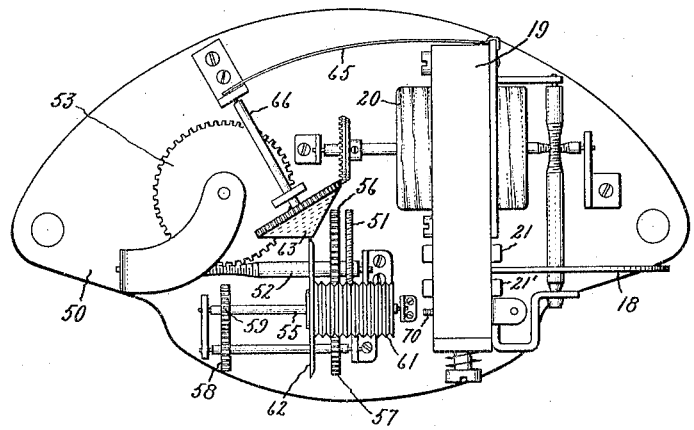
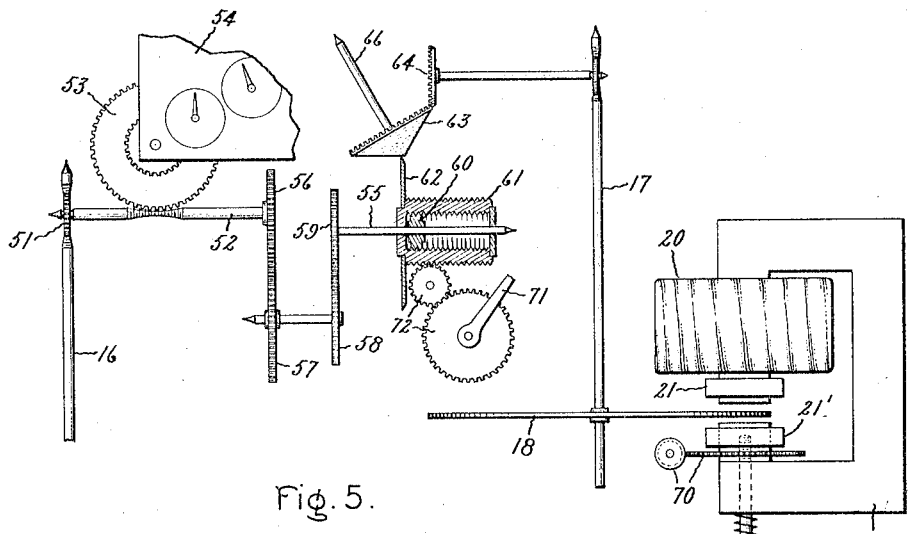
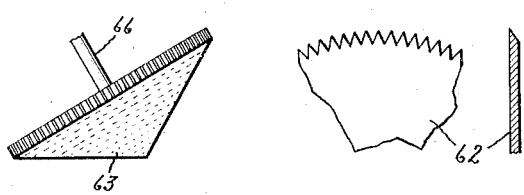

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND-INDICATOR.

1,331,059.  Specification of Letters Patent.  Patented Feb. 17, 1920.

Application filed September 5, 1916. Serial No. 118,426.

*To all whom it may concern:*

Be it known that I, CHESTER I. HALL, a citizen of the United States, residing at Fort Wayne, in the county of Allen, State of Indiana, have invented certain new and useful Improvements in Demand-Indicators, of which the following is a specification.

My invention relates to demand indicators, and in particular to apparatus for indicating the maximum demand made by an electrical installation upon its source of electric energy supply. The object of the invention is to provide an improved demand indicator. More particularly the object of the invention is to provide an improved maximum demand indicator for measuring the average demand of an electrical installation over a substantial interval of time. A further object of the invention is to provide a demand indicator without electrical contacts, gear-opening, and other more or less unreliable mechanical or electrical combinations. Other objects of the invention will be brought out hereinafter.

The improved demand indicator of my present invention is adapted to indicate the average demand of an electrical installation over a substantial time interval. In principle, the indicator depends upon making a comparison in speeds between the speed of an integrating electric motor meter and the speed of another rotatable element. This comparison is effected by a differential gearing device, a member of which assumes various positions, dependent upon the difference between the speeds of the meter and the other rotatable element. The positions assumed by this member are an indication of the maximum demand, as is later described in detail. For the purpose of clearness and conciseness in the description of my invention throughout this specification, I have described this other rotatable element as a balancing element, and I have considered or used expressions similar to balancing or effecting a balance of the speeds of the motor meter and the rotatable or balancing element to mean that the speeds are balanced when the differential mechanism connecting the two shafts, in a manner which will be described later, operates at such velocities that the member or disk, as described later, which has a velocity of rotation imparted to it by both shafts, and which by its axial movement at right angles to its movement of rotation shows the maximum demand, has substantially no longitudinal movement and thus remains in or has reached a substantially stationary position. Thus, in one form of the invention, the meter shaft is connected to the balancing element, such as a second shaft rotating at a constant speed, through a mechanism, including a variable velocity ratio device, and changes in the speed of the meter shaft are balanced by corresponding changes in the velocity ratio of such device. In another form of the invention, the speed of the balancing rotating element is varied to balance changes in speed of the meter shaft.

The novel features of the invention which I believe to be patentable are definitely indicated in the claims appended hereto. The principle of the invention together with the construction and mode of operation of demand indicators embodying the same will be best understood from the following description taken in conjunction with the accompanying drawings, in which:

Figure 1 diagrammatically illustrates that form of the invention in which the meter shaft and the balancing element are operatively connected through a variable velocity ratio device; Fig. 2 diagrammatically illustrates that form of the invention in which the speed of the balancing element is varied to balance the speed of the meter shaft; Fig. 3 is an elevation of a demand indicator attachment for an integrating electric motor meter embodying that form of the invention illustrated in Fig. 1; Fig. 4 is a diagrammatic view of the demand indicator attachment shown in Fig. 3; and Fig. 5 is a detail view showing the cone and coöperating disk employed in the construction shown in Figs. 3 and 4.

The indicator diagrammatically shown in Fig. 1 of the drawings represents that form of the invention in which the speed of the meter shaft is balanced by a variable gear ratio device operatively connected between the meter shaft and a second shaft rotating at a uniform speed. This figure shows for the purpose of explanation a very simple construction of this form of my improved demand indicator. A more practical construction of this form of the indicator is shown in Figs. 3 and 4. The principle of the invention will, however, be best understood by first considering the simple construction shown in Fig. 1. In this figure there is represented a system of electrical distribution comprising conductors 10 supplying electric energy in the form of alternating current to translating devices 11. An integrating watthour meter of the induction meter type is connected in the system in the usual manner for the purpose of integrating and registering the total quantity of energy consumed in the translating devices. The watthour meter comprises the usual series coils 12 and potential coil 13 which produce a shifting magnetic field proportional to the instantaneous rate of the consumption of energy, in the well understood manner. A rotatable disk armature 14, of aluminum or other suitable conducting material, is located within the influence of the shifting magnetic field produced by the coils 12 and 13. Permanent magnets 15 are mounted in operative relation to the disk armature 14, so that the revolutions of the armature are directly proportional to the watthours of energy consumed in the translating devices. The armature 14 is secured to a pivoted shaft 16, which I will hereinafter call the meter shaft. The speed of rotation of the disk armature 14 and meter shaft 16 is proportional to and a measure of the rate of consumption of energy in the installation.

The meter shaft 16 is operatively connected through a variable velocity ratio device to a second rotatable shaft 17. The shaft 17 is rotated at a uniform or constant speed by any suitable means. For purpose of explanation I have shown a constant speed electric motor of the induction motor type for driving the shaft 17. This induction motor comprises a disk armature 18, of aluminum or other suitable conducting material, secured to the shaft 17 and arranged to rotate in the air gap of a laminated magnetic core 19. Energizing coils 20 are mounted on the magnetic core 19 and are adapted to be connected across the conductors 10, or to any other suitable alternating current source of constant potential. A short-circuited coil 21 surrounds a portion of one pole of the magnetic core 19, thereby forming a shaded-pole induction motor element of well known form.

The meter shaft 16 drives a friction cone 22 through crown gearing 23. The constant speed shaft 17 drives a screw-threaded shaft 24 through suitable intermediate gearing. A friction disk 25 is operatively mounted on the screw-threaded portion of the shaft 24 and has its periphery in frictional engagement with the surface of the cone 22. The disk 25 is in the form of a nut threaded on the shaft 24, and forms with the shaft the well known screw and nut movement.

An indicator 26 is slidably mounted on a guide bar 27 and is adapted to be moved along this guide bar by the friction disk 25. A scale 28 coöperates with the indicator 26 to show the maximum movement of the disk 25 from its zero or initial position, as determined by a fixed stop 29 secured to the shaft 24.

The operation of the indicator diagrammatically represented in Fig. 1 is as follows: The friction disk 25 moves along the screw-threaded portion of the shaft 24 until the angular velocity ratio of the disk and cone is such as to balance the speeds of the meter shaft 16 and the constant speed shaft 17. When the speeds of these two shafts are balanced, the disk 25 remains at rest with respect to its initial or zero fixed stop 29. Upon any change in the speed of the meter shaft, the disk 25 will move longitudinally along the screw shaft 24 until a position has been reached where the velocity ratio of the disk and cone is such as to again balance the speeds of the two shafts. The faster the meter shaft 16 rotates the farther will the disk 25 be moved from its initial stop 29, and the position of the indicator 26 thus shows the maximum movement of the disk, thereby indicating the maximum speed of the meter shaft, and hence the maximum electrical demand of the translating device 11.

The disk 25 does not instantly respond to changes in speed of the meter shaft, due to the gearing between the meter shaft and the constant speed shaft. The time interval in which the disk 25 completely responds to any predetermined change in speed of the meter shaft is determined by the connections between the meter shaft and the constant speed shaft, and any desired time interval can be obtained by suitably designing these connections. In this manner, longitudinal movement of the disk 25 along the screw shaft 24 serves as a measure of the average electrical demand of the devices 11 over a substantial interval of time, and this time interval can be made of any desired length by suitably designing the connections between the two shafts 16 and 17. It will also be understood that various characteristic curves of operation may be obtained by employing different conformations of the surface of the cone.

The cone 22, the screw-threaded shaft 24 and the disk 25 form in effect a sort of differential mechanical movement, in which the disk is the differentially movable member thereof. As long as the speeds of the two shafts are balanced the disk remains relatively stationary. Any unbalancing of these speeds, due to a change in the demand of the devices 11, with the resultant change in the speed of the meter shaft, causes the disk to move along the screw shaft 24, and this differential movement of the disk effects a balance of the speeds of the shaft by altering the angular velocity ratio of the cone and disk to correspond to the altered speed of the meter shaft. The time required for the disk to move from its zero position to the proper position for balancing the speed of the meter shaft is the same for any uniform demand. In other words, the disk will always travel from its initial position to a point of rest in the same time interval, regardless of the rate of energy consumption, provided the rate of energy consumption remains uniform during the time interval. As heretofore suggested, this time interval can be of any desired duration by properly proportioning the connections between the meter shaft and the constant speed shaft. When the demand or rate of energy consumption is not uniform, the disk 25 will move back and forward following the fluctuations of the demand. An increased or decreased demand must persist for a substantial and definite length of time, determined by the design of the indicator, before the disk assumes its position of balance.

In Fig. 2 of the drawings, there is diagrammatically represented an indicator embodying that form of the invention in which the speed of the balancing shaft is varied instead of the velocity ratio of two elements connecting the balancing shaft and the meter shaft. Corresponding elements of the indicator of Fig. 2 are designated by the same reference characters as in the indicator of Fig. 1. The disk armature 18 secured to the balancing shaft 17 rotates between the poles of a pivoted magnetic core 30. An energizing coil 31, adapted to be connected across the conductors 10, is mounted on the core 30. The core 30 is carried by a pivoted shaft 32, whereby the position of the poles of the core with respect to the disk armature 18 can be altered by turning this shaft. A short-circuited coil 33 covers a portion of the face of one of the poles of the core 30, thus forming a shaded-pole induction motor element, just as in the indicator of Fig. 1. It will thus be observed that the speed of the disk 18 can be altered by turning the shaft 32, and hence the core 30. The shaft 32 carries at its upper end a gear 34 meshing with a pinion 35 at the lower end of a shaft 36. A gear 37 is secured to the upper end of the shaft 36 and meshes with an externally grooved screw-follower or nut 38. The nut 38 is internally threaded and is mounted on a screw shaft 39 operatively connected to the meter shaft 16. The nut 38 is adapted to be driven by the shaft 17 by means of a gear 40 secured to the nut and an elongated pinion 41. Longitudinal movement of the nut 38 along the screw 39 is indicated by a pointer 42 arranged to sweep across a stationary scale 43. The pointer 42 is secured to the upper end of a shaft 44 carrying at its lower end a gear 45 meshing with the externally grooved surface of the nut 38, and a non-return pointer 46 indicates the maximum extent of movement of the pointer 42, and hence of the nut 38, in the well understood manner.

The operation of the indicator of Fig. 2 is as follows: Upon any change in the speed of the meter shaft 16, the nut 38 moves along the screw 39 until the speed of the shaft 17 has been altered by movement of the magnetic core 30 to balance the altered speed of the meter shaft. When the apparatus is in its initial position, the magnetic core 30 will be moved so that no torque is exerted on the shaft 17, and all parts of the indicator will be at rest. When the meter shaft 16 begins to rotate, upon a consumption of energy in the translating devices 11, the nut 38 will move along the shaft 39 in such a direction as to cause the shaded-pole induction motor element to exert a torque on the shaft 17 of gradually increasing value, until the speed of the shaft 17 balances the speed of the shaft 16, whereupon the nut 38 comes to rest. The operation of the indicator of Fig. 2 is otherwise substantially the same as that of the indicator of Fig. 1, and will be clearly understood by those skilled in the art from the discussion of the latter indicator. It will be observed, however, that in the indicator of Fig. 2, the balancing shaft 17 comes to rest in a definite time interval after the interruption of the energy consumption in the translating devices 11. For example, if the indicator is designed on the basis of a thirty minute time interval, the magnetic core 30 will be moved to such a position that the shaft 17 ceases to rotate in substantially thirty minutes after the load of the devices 11 is thrown off the system.

In Figs. 3 and 4 of the drawings, I have shown a demand indicator attachment, embodying the principle of my present invention, adapted to be carried by the supporting plates of an ordinary meter register. The actual arrangement and relation of the various elements of this device are shown in Fig. 3, while in Fig. 4, the elements have been slightly rearranged and their relations somewhat distorted in order to clearly indicate the operation of the device. The demand indicator attachment shown in Figs. 3 and 4 is adapted to be applied to an ordinary electric motor meter in place of the usual meter register. All of the operative elements of the demand indicator are mounted on the rear plate 50 of the usual meter register. It will be understood that the usual ratio gearing and dials of the register are in back of the plate 50, as viewed in Fig. 3. The worm gear cut on the meter shaft 16 is adapted to mesh with a gear 51 secured to a shaft 52. The first gear 53 of the ratio gearing of the meter register meshes with a worm on the shaft 52. The meter register is indicated at 54 in Fig. 4 of the drawings. The meter-driven shaft 52 drives another shaft 55 through a train of reduction gearing 56—57—58—59. A screw 60 is secured to the shaft 55, and is thus adapted to be driven by the meter shaft 16. An externally grooved nut or screw-follower 61 is mounted for longitudinal movement along the shaft 55, and has its internally threaded portion meshing with the screw 60. A disk 62 is secured to the nut 61 and is adapted to engage the periphery of a cone 63. The cone 63 is adapted to be driven by the constant speed balancing shaft 17 through suitable crown gearing 64. The cone 63 is held firmly against the periphery of the disk 62 by means of a leaf spring 65, which bears against the outer end of the shaft 66 upon which the cone is mounted (Fig. 3).

The shaft 17 is driven at constant speed by a shaded-pole induction motor element, just as in the indicator of Fig. 1, and corresponding elements of this motor element are designated by the same reference characters as in Fig. 1. In Fig. 4 the induction motor element has an additional short-circuited coil 21' on the lower pole face of the magnetic core 19. The position of the short-circuited coil 21' is adapted to be adjusted for calibration purposes by means of suitable gearing 70.

The surface of the cone 63 is preferably composed of a soft metal, such for example as a soft solder. The whole cone may be made of such soft metal, or a surface layer of this soft metal may be applied to a cone of harder material. The disk 62 is of steel or bronze and has a serrated periphery, as shown in Fig. 5. The pointed teeth of the serrated periphery of the disk make minute indentations in the soft metal surface of the cone, and as the disk moves back and forth the whole surface of the cone becomes indented. These indentations in the surface of the cone form in effect a large number of gears of varying numbers of teeth with which the disk 62 is adapted to mesh. By this construction the engagement of the disk and cone is positive and there is no slipping of these two elements.

The nut 61 also has a series of parallel grooves on its external surface and by its longitudinal movement is adapted to drive a pointer 71 through gearing 72. The maximum movement of the pointer 71 can be indicated by a non-return member, just as in the indicators of Figs. 1 and 2. Such non-return member has been omitted in Figs. 3 and 4 in the interests of clearness.

The operation of the indicator shown in Figs. 3 and 4 will, it is believed, be clearly understood from the foregoing description of the indicator of Fig. 1. In the indicator of Fig. 4, the cone is driven by the constant speed shaft 17 so that the initial position of the disk 62 is at the apex of the cone, which is practically a more satisfactory arrangement than shown in Fig. 1. As the speed of the meter shaft 16 increases the speed of the screw 60 also increases. The nut 61 is then moved toward the left, Figs. 3 and 4, until the speed at which it is driven by the cone 63 and disk 62 balances the speed at which the screw 60 is driven by the meter shaft.

It will be observed from the foregoing descriptions that the improved demand indicator of my present invention has no electrical contacts, and that in its operation there is no opening of gearing, such as is commonly employed in many present day types of demand indicators. The indicator is very compact and consists of but few parts, and can be designed as an attachment to be carried by the usual meter register of an ordinary electric motor meter. The connections between the meter shaft and the balancing rotating shaft are simple and reliable, and there are no elements or mechanical movements employed that are liable to cause a failure of the indicator to operate or properly function.

I have hereinbefore stated that my present invention involves the principle of the balancing of the speed of a meter shaft by the speed of a second rotating shaft. In both forms of the invention herein particularly described and illustrated, the meter shaft is operatively connected to the balancing rotating shaft through a differential mechanism consisting of two driven elements and a differentially movable element, and the speeds of the two shafts are balanced by the differential movement of the latter element.

In have herein shown and particularly described certain embodiments of my invention for the purpose of explaining its principle and showing its applications, but numerous modifications of the details of construction and arrangement of these embodiments and other applications will present themselves to those skilled in the art. I, therefore, wish to cover by the following claims all modifications within the spirit of my invention.

What I claim as new and desire to secure by Letters Patent of the United States, is:—

1. A demand indicator comprising in combination an integrating electric meter having a rotatable shaft, a second rotatable shaft, means for driving said second shaft, a differential mechanism having two driven elements and a differentially movable element, means connecting one of said driven elements to said meter shaft and the other of said driven elements to said second rotatable shaft, means whereby any change in speed of said meter shaft causes said differentially movable element to alter its position until its relation with respect to said two coöperating driven elements is balanced, and means for indicating the maximum movement of said differentially movable element.

2. A demand indicator comprising in combination an integrating electric meter having a rotatable shaft, a second rotatable shaft, means for driving said second shaft, a differential mechanism having two driven elements and a differentially movable element, means connecting one of said driven elements to said meter shaft and the other of said driven elements to said second rotatable shaft, means whereby any change in speed of the driven element connected to said meter shaft effects a compensating change in the velocity ratio of said differentially movable element and the driven element connected to said second rotatable shaft, and means for indicating the maximum movement of said differentially movable element.

3. A demand indicator comprising in combination an integrating electric meter having a rotatable shaft, a second rotatable shaft, means for driving said second shaft, a differential mechanism consisting of a nut threaded on a screw and operatively engaging a cone, said cone and screw constituting the driven elements of said mechanism, means connecting one of said driven elements to said meter shaft and the other of said driven elements to said second rotatable shaft, means whereby any change in speed of said meter shaft effects a compensating change in the velocity ratio of said cone and nut, and means for indicating the maximum movement of said nut.

4. A demand indicator comprising in combination an integrating electric meter having a rotatable shaft, a second rotatable shaft, means for driving said second shaft, a differential mechanism consisting of a nut threaded on a screw and operatively engaging a cone, means operatively connecting said screw to said meter shaft, means operatively connecting said cone to said second rotatable shaft, means whereby any change in speed of said meter shaft effects a compensating change in the velocity ratio of said cone and nut, and means for indicating the maximum movement of said nut.

5. A demand indicator comprising in combination an integrating electric meter having a rotatable shaft, a second rotatable shaft, means for driving said second shaft, means operatively connecting said two shafts, a member relatively movable with respect to said shafts included in said last mentioned means, means whereby any change in speed of said meter shaft causes said member to move with respect to said second shaft, and means for indicating the maximum movement of said member.

6. A demand indicator comprising in combination an integrating electric meter having a rotatable shaft, a second rotatable shaft, means for driving said second shaft, mechanism including a differentially movable member operatively connecting said two shafts having a movement of rotation and a longitudinal movement, means whereby any change in speed of said meter shaft causes said differentially movable member to move longitudinally until it assumes a position substantially constant with respect to its initial position, and means for indicating the maximum movement of said member.

7. A demand indicator comprising in combination an integrating electric meter having a rotatable shaft, a second rotatable shaft, means for driving said second shaft, means operatively connecting said two shafts, a longitudinally moving member relatively movable with respect to each of said shafts included in said last mentioned means, said member remaining relatively stationary with respect to its initial position, means whereby any change in the speed of said meter shaft causes said member to assume a different position also relatively stationary to its initial position, and means for indicating the maximum movement of said member.

8. A demand indicator comprising in combination an integrating electric meter having a rotatable shaft, a second rotatable shaft, means for driving said second shaft at substantially constant speed, mechanism including a differentially movable member operatively connecting said two shafts, means whereby movement of said member changes the velocity ratio of the mechanism connecting said shafts, said member being so arranged that upon any change in speed of said meter shaft the member is moved so as to vary the velocity ratio of said mechanism in a manner to compensate for the altered speed of the meter shaft, and means for indicating the maximum movement of said member.

9. A demand indicator comprising in combination an integrating electric meter having a rotatable shaft, a second rotatable shaft, means for driving said second shaft at substantially constant speed, mechanism of variable velocity ratio operatively connecting said two shafts, and means whereby the velocity ratio of said mechanism is varied upon any change in speed of said meter shaft in a manner to compensate for the altered speed of the meter shaft, and means for indicating the maximum change in the velocity ratio of said mechanism.

10. A demand indicator comprising in combination an integrating electric meter having a rotatable shaft, a second rotatable shaft, means for driving said second shaft at substantially constant speed, means including a relatively movable cone and coöperating disk for operatively connecting said shafts, said cone and disk being so arranged that any change in speed of the meter shaft causes a relative movement of the disk and cone thereby varying the velocity ratio of these two elements so as to compensate for the altered speed of the meter shaft, and means for indicating the maximum relative movement of the cone and disk.

11. A demand indicator comprising in combination an integrating electric meter having a rotatable shaft, a second rotatable shaft, means for driving said second shaft at substantially constant speed, a screw driven by said meter shaft, a nut coöperating with said screw, a cone driven by said second shaft, a disk secured to said nut and coöperating with said cone and adapted to be driven thereby, and means for indicating the maximum movement of said nut.

12. A demand indicator comprising in combination an integrating electric meter having a rotatable shaft, a second rotatable shaft, means for driving said second shaft at substantially constant speed, means including a relatively movable cone and coöperating disk for operatively connecting said shafts, said cone and disk being so arranged that any change in speed of the meter shaft causes a relative movement of the disk and cone thereby varying the velocity ratio of these two elements so as to compensate for the altered speed of the meter shaft, the surface of said cone being of relatively soft metal and the periphery of said disk being serrated whereby the serrated periphery of the disk indents the surface of the cone, and means for indicating the maximum relative movement of the cone and disk.

13. A demand indicator comprising in combination an integrating electric meter having a rotatable shaft, a second rotatable shaft, means for driving said second shaft at substantially constant speed, a screw driven by said meter shaft, a member longitudinally movable with respect to said screw and having an internally threaded portion engaging therewith, a cone driven by said second shaft, a disk secured to said member and coöperating with said cone and adapted to be driven thereby, and means for indicating the maximum movement of said member.

14. A demand indicator comprising in combination an integrating electric meter having a rotatable shaft, a second rotatable shaft, means for driving said second shaft, a differential mechanism having two driven elements and a differentially movable element, means connecting one of said driven elements to said meter shaft and the other of said driven elements to said second rotatable shaft, the elements of said differential mechanism being so arranged that the differentially movable element remains relatively stationary with respect to its initial position when the speeds of the two shafts have a constant ratio to each other, and means whereby said differentially movable element moves longitudinally when this relation is changed and assumes a new position also relatively stationary to its initial position when the speeds of the two shafts have another constant ratio to each other, and means for indicating the maximum movement of said differentially movable element.

In witness whereof, I have hereunto set my hand this 30th day of August, 1916.

CHESTER I. HALL.